US010939379B2

(12) United States Patent
Quinlan et al.

(10) Patent No.: US 10,939,379 B2
(45) Date of Patent: Mar. 2, 2021

(54) WAKE-UP WIRELESS SENSOR NODES (71) Applicant: Analog Devices Global, Hamilton (BM)

(72) Inventors: Philip P. E. Quinlan, Glounthane (IE); Paul Lambkin, Carrigaline (IE)

(73) Assignee: Analog Devices Global, Hamilton (BM)

( * ) Notice: Subject to any disclaimer, the term of this patent is extended or adjusted under 35 U.S.C. 154(b) by 354 days.

(21) Appl. No.: 15/809,520

(22) Filed: Nov. 10, 2017

(65) Prior Publication Data
US 2018/0139698 A1 May 17, 2018

Related U.S. Application Data (60) Provisional application No. 62/421,728, filed on Nov. 14, 2016.

(51) Int. Cl.
*H04W 52/02* (2009.01)
*H04W 88/02* (2009.01)
(Continued)

(52) U.S. Cl.
CPC ........ *H04W 52/0235* (2013.01); *G08C 17/02* (2013.01); *H04Q 9/00* (2013.01); *H04W 88/02* (2013.01); *Y02D 30/70* (2020.08)

(58) Field of Classification Search
CPC ..... G08C 17/02; H04Q 9/00; H04W 52/0235; H04W 88/02; Y02D 70/00; Y02D 70/142;
(Continued)

(56) References Cited

U.S. PATENT DOCUMENTS 4,326,164 A    4/1982  Victor
5,834,942 A   11/1998  De Angelis
(Continued)

FOREIGN PATENT DOCUMENTS

CA    2 864 817 A1    8/2013
EP    3 190 421 A1    7/2017
(Continued)

OTHER PUBLICATIONS

International Search Report and Written Opinion dated Sep. 25, 2017 in connection with International Application No. PCT/US2017/036719.
(Continued)

*Primary Examiner* — Andrew Lai
*Assistant Examiner* — M Mostazir Rahman
(74) *Attorney, Agent, or Firm* — Wolf, Greenfield & Sacks, P.C.

(57) ABSTRACT

A wireless sensor node is described. The wireless sensor node may include a wake-up circuitry configured to awaken the sensor when a request is received. The sensor may be placed in a sleep mode, thus saving battery usage until a wake-up signal requesting use of the sensor is received. Powering of the wake-up circuitry may be supplied through energy captured using an energy harvester. In one example, the energy for powering the wake-up circuitry is extracted from the same signal used for awakening the sensor. The wireless sensor mode may operate in a passive mode, in which the energy for powering the wake-up circuitry is harvested, or in a power supply-assisted mode, in which some of the power is provided by a power supply. High quality factors filters may be used to increase the signal-to-noise ratio of the wake-up signals, thus improving the node's ability to recognize activation requests.

20 Claims, 10 Drawing Sheets

(51) Int. Cl.
*G08C 17/02* (2006.01)
*H04Q 9/00* (2006.01)

(58) Field of Classification Search
CPC .. Y02D 70/144; Y02D 70/162; Y02D 70/164; Y02D 70/26
See application file for complete search history.

(56) References Cited

U.S. PATENT DOCUMENTS

| | | |
|---|---|---|
| 7,244,500 B2 | 7/2007 | Watts et al. |
| 7,398,184 B1 | 7/2008 | Chen |
| 8,552,597 B2 | 10/2013 | Song et al. |
| 9,091,657 B2 | 7/2015 | Kessler et al. |
| 9,232,475 B2 | 1/2016 | Heinzelman et al. |
| 9,372,209 B2 | 6/2016 | Iwamoto |
| 9,480,163 B2 | 10/2016 | Kessler et al. |
| 10,502,676 B2 | 12/2019 | Kessler et al. |
| 2005/0183492 A1 | 8/2005 | Rao et al. |
| 2005/0269213 A1 | 12/2005 | Steimle et al. |
| 2006/0162431 A1 | 7/2006 | Harris et al. |
| 2007/0120572 A1 | 5/2007 | Chen et al. |
| 2008/0135614 A1 | 6/2008 | Werner et al. |
| 2008/0202930 A1 | 8/2008 | Mett |
| 2008/0204275 A1 | 8/2008 | Wavering et al. |
| 2009/0039864 A1 | 2/2009 | Gordon |
| 2009/0121872 A1 | 5/2009 | Lynch et al. |
| 2010/0008825 A1 | 1/2010 | Subramanyam |
| 2010/0097273 A1 | 4/2010 | Biris et al. |
| 2010/0320569 A1 | 12/2010 | Narita |
| 2011/0012723 A1 | 1/2011 | Adamson et al. |
| 2011/0240621 A1 | 10/2011 | Kessler et al. |
| 2012/0038377 A1 | 2/2012 | Hamann et al. |
| 2012/0055810 A1 | 3/2012 | Zhou |
| 2012/0256492 A1* | 10/2012 | Song .................. H02J 1/102 307/66 |
| 2012/0286804 A1 | 11/2012 | Kato et al. |
| 2013/0210154 A1 | 8/2013 | Dieckhoff et al. |
| 2013/0230429 A1 | 9/2013 | Naishadham et al. |
| 2014/0126442 A1* | 5/2014 | Jafarian ............ H04W 52/0212 370/311 |
| 2014/0184249 A1 | 7/2014 | Saafi et al. |
| 2014/0200538 A1 | 7/2014 | Euliano et al. |
| 2014/0254445 A1* | 9/2014 | Heinzelman ...... H04W 52/0229 370/311 |
| 2015/0317896 A1 | 11/2015 | Planton et al. |
| 2015/0330212 A1 | 11/2015 | Sassi et al. |
| 2016/0007288 A1* | 1/2016 | Samardzija ....... H04W 52/0229 370/311 |
| 2016/0050757 A1 | 2/2016 | Diao et al. |
| 2016/0196455 A1* | 7/2016 | Gudan ................ H04B 5/0062 340/10.5 |
| 2016/0238547 A1 | 8/2016 | Park et al. |
| 2016/0254844 A1* | 9/2016 | Hull ..................... H04B 5/0062 340/6.1 |
| 2016/0302264 A1 | 10/2016 | Kessler et al. |
| 2017/0019954 A1 | 1/2017 | Kessler et al. |
| 2017/0237466 A1 | 8/2017 | Carr |
| 2017/0358854 A1 | 12/2017 | Stein |
| 2018/0003615 A1 | 1/2018 | Kessler et al. |

FOREIGN PATENT DOCUMENTS

| | | |
|---|---|---|
| KR | 10-0839226 B1 | 6/2008 |
| WO | WO 2006/137849 A1 | 12/2006 |
| WO | WO 2008/125878 A1 | 10/2008 |

OTHER PUBLICATIONS

International Preliminary Report on Patentability dated Dec. 20, 2018 in connection with International Application No. PCT/US2017/036719.
International Search Report and Written Opinion dated Oct. 24, 2017 in connection with International Application No. PCT/US2017/040356.
International Preliminary Report on Patentability dated Jan. 10, 2019 in connection with International Application No. PCT/US2017/040356.
Kang, Carbon Nanotube Smart Materials. Thesis submitted to the Division of Research and Advanced Studies of the University of Cincinnati. 2005; 170 pages.
Kang et al., Structural Health Monitoring based on Electrical Impedance of a Carbon Nanotube Neuron. Key Engineering Materials. 2006;321-323:140-5.
Kessler, Structural Health Monitoring Capabilities. Metis Design Corporation. Powerpoint Presentation 2008, 42 pages.
Oh et al., A 116n W Multi-Band Wake-Up Receiver with 31-bit Correlator and Interference Rejection. Custom Integrated Circuits Conference (CICC), 2013 IEEE. 4 pages.
Roberts et al., A 236nW-56.5dBm-Sensitivity Bluetooth Low-Energy Wakeup Receiver with Energy Harvesting in 65nm CMOS. 2016 IEEE International Solid-State Circuits Conference. Digest of Technical Papers. 2016; pp. 450-1.
Rocheleau et al., MEMS-Based Tunable Channel-Selecting Super-Regenerative RF Transceivers. Berkeley Sensor & Actuator Center. University of California. Prepublication Data Sep. 2015; 2 pages.
Sample et al., Design of an RFID-Based Battery-Free Programmable Sensing Platform. IEEE Transactions on Instrumentation and Measurement. Nov. 2008;57(11):2608-15.
PCT/US2017/036719, Sep. 25, 2017, International Search Report and Written Opinion.
PCT/US2017/036719, Dec. 20, 2018, International Preliminary Report on Patentability.
PCT/US2017/040356, Oct. 24, 2017, International Search Report and Written Opinion.
PCT/US2017/040356, Jan. 10, 2019, International Preliminary Report on Patentability.

\* cited by examiner

WAKE-UP WIRELESS SENSOR NODES

CROSS-REFERENCE TO RELATED APPLICATIONS

This application claims the benefit under 35 U.S.C. § 119(e) of U.S. Provisional Patent Application Ser. No. 62/421,728, entitled "WAKE-UP WIRELESS SENSOR NODES," filed on Nov. 14, 2016, which is hereby incorporated herein by reference in its entirety.

FIELD OF THE DISCLOSURE

The present application relates to wireless sensor nodes.

BACKGROUND

Wireless sensor nodes are often deployed at remote locations to monitor environmental or physical conditions, such as temperature or pressure. Wireless sensor nodes are equipped with wireless transceivers for transmitting measurement data to a base station.

SUMMARY OF THE DISCLOSURE

Some aspects of the present application are directed to wireless sensor nodes. A wireless sensor node of the types described herein may include a wake-up circuitry configured to awaken the sensor when a request is received. The sensor may be placed in a sleep mode, thus saving battery usage until a wake-up signal requesting use of the sensor is received. Powering of the wake-up circuitry may be supplied through energy captured using an energy harvester. In one example, the energy for powering the wake-up circuitry is extracted from the same signal used for awakening the sensor. The wireless sensor mode may operate in a passive mode, in which the energy for powering the wake-up circuitry is harvested, or in a power supply-assisted mode, in which some of the power is provided by a power supply. High quality factor filters may be used to attenuate high interference due to neighboring channels and to increase the signal-to-noise ratio of the wake-up signals, thus improving the node's ability to recognize activation requests.

According to one aspect of the present disclosure, a wireless sensing apparatus is provided. The wireless sensing apparatus may comprise a sensor unit; wake-up circuitry connected to an antenna and configured to activate the sensor unit from a sleep mode upon receiving a wake-up signal from the antenna, the wake-up circuit having an input power terminal; an energy harvester connected to the antenna and configured to capture electromagnetic energy received from the antenna; and a switch connected to the input power terminal of the wake-up circuitry, the energy harvester and a power supply, the switch being configured to be controlled by a user to select a source of power for the wake-up circuitry between the power supply and the energy harvester.

According to another aspect of the present disclosure, a method for operating a wireless sensing apparatus is provided. The method may comprise receiving a wake-up signal through an antenna and determining whether a packet of the received wake-up signal substantially matches a wake-up code stored in a memory unit; with wake-up circuitry, activating a sensor unit of the wireless sensing apparatus from a sleep mode based on whether the packet substantially matches the wake-up code; and receiving input from a user selecting one power mode between a passive mode and a power supply-assisted mode; wherein: in the power supply-assisted mode, the wake-up circuitry is configured to be powered at least partially by a power supply; and in the passive mode, the wake-up circuitry is configured to be powered using electromagnetic energy extracted with an energy harvester.

According to yet another aspect of the present disclosure, a wireless sensing apparatus is provided. The wireless sensing apparatus may comprise a sensor unit; wake-up circuitry connected to an antenna and configured to activate the sensor unit from a sleep mode upon receiving a wake-up signal from the antenna, an energy harvester connected to the antenna, the energy harvester being configured to capture electromagnetic energy received from the antenna and to power at least partially the wake-up circuitry with the captured electromagnetic energy; and a bandpass filter disposed between the antenna and the wake-up circuitry and configured to filter the wake-up signal, the bandpass filter having a quality factor (Q) that is between 1000 and 10000.

BRIEF DESCRIPTION OF THE DRAWINGS

Various aspects and embodiments of the disclosure will be described with reference to the following figures. It should be appreciated that the figures are not necessarily drawn to scale. Items appearing in multiple figures are indicated by the same reference number in all the figures in which they appear.

DETAILED DESCRIPTION

Applicant has appreciated that the power consumption of wireless sensors may be decreased by keeping the wireless sensor in a "sleep mode" when no monitoring activity is performed, and by "waking-up" the wireless sensor node on demand. Wireless sensors of the type described herein, also referred to simply as "nodes," may include or be coupled to wireless transceivers. Such wireless transceivers may be configured to transmit/receive signals to a base station, such as sensor data collected by the sensor node. In some embodiments, a wireless transceiver may be in sleep mode while the sensor portion of the node may be active. For example, the sensor node may be processing sensor data and/or storing sensor data into a memory unit, but the transceiver portion may be in sleep mode. In other embodiments, the sensor node may also be in a sleep mode when the transceiver is in a sleep mode. In some embodiments, waking a transceiver, or a node more generally, from a sleep mode, may be performed by applying power to the node and/or asserting a wake-up signal. In some embodiments, in the sleep mode, the device may consume little or no power, and the power consumption may be determined by device leakage currents. In some embodiments, the power consumption may be less than 10 nW, less than 5 nW or less than 1 nW. The node may be referred to as being in a deep sleep mode when the power consumption is determined by the device leakage currents.

In other embodiments, in the sleep mode, the sensor node's internal clock may time out between transmission and reception sessions. In these embodiments, the device may consume some power (typically small levels of power but it may become large and even dominate the battery lifetime if this sleep time is very long). In these circumstances, the device may have an average power consumption that is dependent on the ratio between the active time and the sleep time.

When a wake-up signal is received, the node may enter an active mode and may start monitoring one or more environmental and/or physical variables. In this way, power consumption may be limited to time periods in which a measurement is actually performed. Additionally, or alternatively, the node may turn on its radiofrequency (RF) transceiver to listen for requests to communicate from a remote device when a wake-up signal is received. In contrast, some conventional wireless sensors are programmed to switch between a sleep mode and an active mode at predefined time intervals. As a result, these conventional wireless sensor nodes are often active, and thus consume power, even in the absence of monitoring activities.

According to one aspect of the present application, a wireless sensor of the type described herein may comprise an energy harvester. The energy harvester may be configured to harvest energy from the surrounding environment. For example, the harvester may be configured to harvest kinetic energy (e.g., from mechanical vibrations), thermal energy (e.g., from a temperature gradient), photovoltaic energy, and/or radio frequency energy. In one specific example, the node may harvest energy from the same wake-up signal used to wake up the node. Accordingly, when a node receives a wake-up signal, an energy harvester may extract electromagnetic energy from the signal, and may use this energy to power the node's circuitry. By using energy obtained from the wake-up signal, the use of batteries may be reduced and battery lifetime may be lengthened. Alternatively, or additionally, a node may be configured to harvest electromagnetic energy from background radiation.

Applicant has further appreciated that, depending on the settings in which the wireless sensor is used, in some circumstances it is desirable to power the operations of the circuitry arranged to receive the wake-up signals (i.e., the wake-up circuitry) using harvested energy only, while in other circumstances it is desirable to rely, at least partially, on a local power supply. The expression "passive mode" is used in some embodiments to indicate powering of the wake-up circuitry using the energy harvester. The expression "power supply-assisted mode" is used in some embodiments to indicate powering of the wake-up circuitry, at least partially, using the local power supply. According to one aspect of the present application, a wireless sensor may be configured to switch between a passive mode and a power supply-assisted mode depending on the requirements called for in the specific application. In this way, instead of having to manufacture different products for different applications, a single product that can be manufactured that meets different needs, thus substantially reducing manufacturing costs.

In some embodiments, the node's wake-up circuitry operates in RF bands where unwanted, high-power interference signals can co-existing at the circuitry's input. Applicant has appreciated that, if these interference signals are not properly attenuated, they may saturate the wake-up circuitry and render it incapable of reliably detect low-level wake-up signals. An example of such a band is the 2.4 GHz Worldwide ISM band, commonly used for many popular wireless connectivity standards such as WiFi, IEEE 802.15.4, Bluetooth Low Energy (BLE) and many others. Due to the presence of these standards, the level of interference in this band is often very high. Applicant has appreciated that this interference may limit a wake-up circuitry's ability to detect and qualify wake-up signals with high reliability. In addition, the presence of broadband noise and interference signals can cause false alarms to occur in a wake-up circuitry, whereby the sensor is awakened even if no request has been sent, thus unnecessarily reducing battery lifetime. Additionally, or alternatively, a wake-up signal may not be recognized as such by the wireless sensor, and as a result, the sensor is not awakened when it should have.

According to one aspect of the present application, interference may be mitigated by using high quality factor (Q) bandpass filters at the wake-up circuitry's input. Increasing the filter's quality factor, which is defined as the ratio between the filter's central frequency and its bandwidth, may significantly attenuate interference and due to neighboring channels and broadband noise that would otherwise be added to the signal being received. In this way, signal integrity can be preserved. In addition, the occurrence of false alarms may be reduced and recognition of wake-up signals may be ensured with high reliability.

Figure 1A:
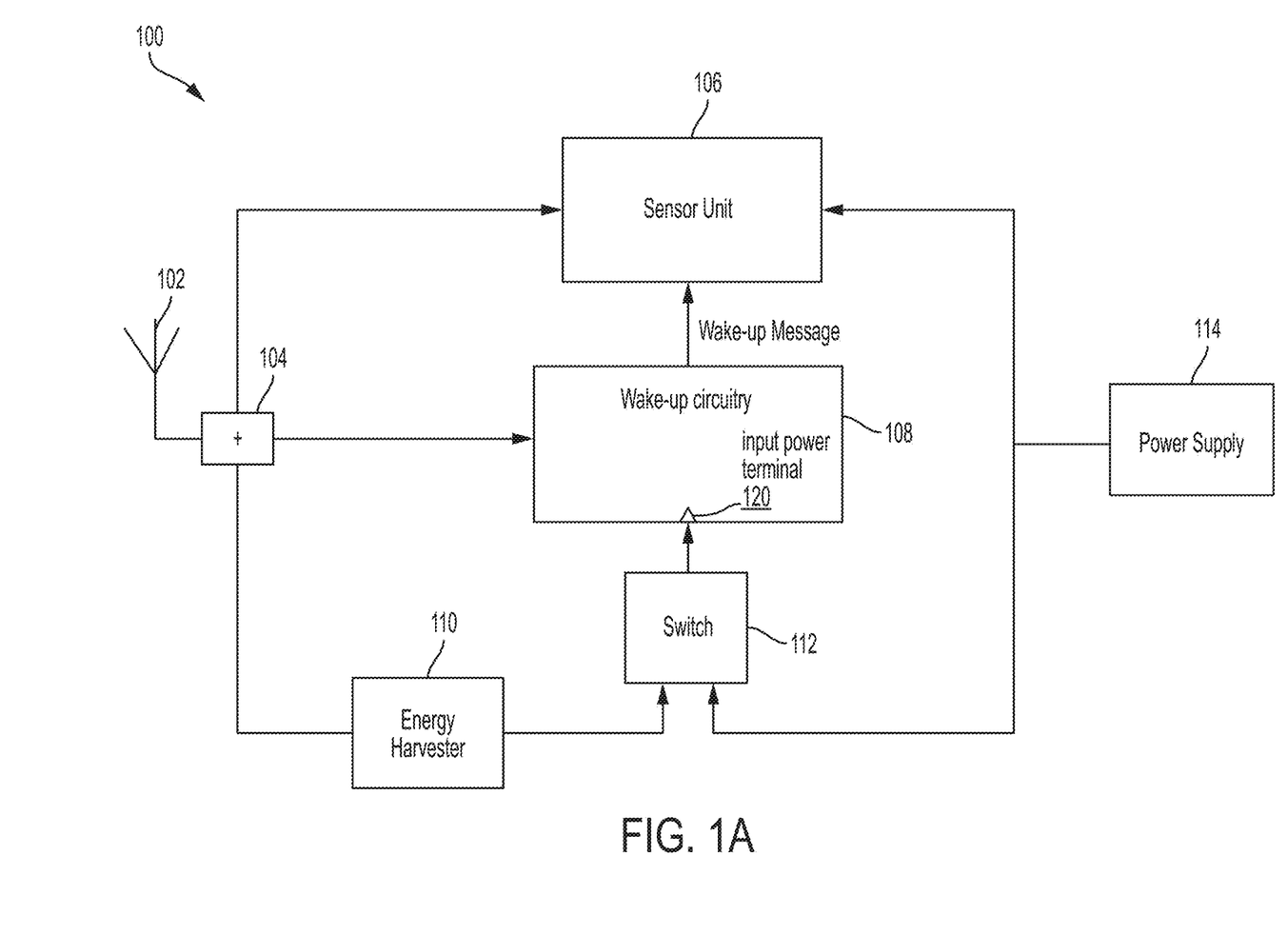
FIG. 1A is a block diagram illustrating a representative wireless sensing apparatus, according to some non-limiting embodiments.

FIG. 1A is a block diagram illustrating a wireless sensing apparatus, according to some non-limiting embodiments. Wireless sensing apparatus 100 may comprise an antenna 102, a combiner 104, sensor unit 106, wake-up circuitry 108, energy harvester 110, switch 112 and power supply 114. Wireless sensing apparatus 100 may be a node in a network of multiple wireless sensors or may operate independently.

Antenna 102, which may comprise a single antenna or an array of antennas, may be configured to receive electromagnetic signals sent from outside the wireless sensing apparatus and/or to transmit electromagnetic signals outside the wireless sensing apparatus. Arrays of antennas may be used in some embodiments to allow for transmission and reception of multiple communication channels. In this way, each communication channel can leverage an individual antenna. Of course, a single antenna may be shared among multiple channels in other embodiments. Antenna 102 may be implemented in any of numerous ways, including for example using a patch antenna. It should be appreciated that communication with wireless sensing apparatus 100 may be performed using any suitable frequency band. In some embodiments, an industrial, scientific and medical (ISM) radio band is used. Examples of ISM radio bands include frequencies between 13.553 MHz and 13.567 MHz, between 902 MHz and 928 MHz, and between 2.4 GHz and 2.5 GHz. However, other frequency bands may be used.

Combiner 104 may be coupled to antenna 102 and may be used to provide sensor unit 106, wake-up circuitry 108 and energy harvester 110 simultaneous access to antenna 102, when needed. Combiner 104 may be implemented, among other devices, as a switch or an adder.

Sensor unit 106 may comprise any suitable type of sensor, such as a temperature sensor, a pressure sensor, an accelerometer, a gyroscope, a heart rate sensor, an acoustic sensor, an ultrasound sensor, a light sensor, an infrared sensor, a speed sensor, a carbon dioxide sensor, a nitrogen oxide sensor, a pH sensor, a flow sensor, a gas sensor, an altimeter, an air speed sensor, a depth sensor, an impact sensor, a free fall sensor, an odometer, a piezoelectric sensor, a position sensor, a GPS sensor, a laser sensor, and/or a proximity sensor. In some embodiments, the sensor unit may comprise one or more active sensors, such as a sonar, a radar and/or a light detection and ranging sensor (e.g., lidar).

Sensor unit 106 may further comprise, at least in some embodiments, circuitry for processing the measured data, such as an analog-to-digital converter (ADC), a processor (e.g., an ASIC, an FPGA or a microcontroller), and a memory. In some embodiments, the sensor unit 106 may comprise a wireless transceiver coupled to the antenna. The wireless transceiver may be used to transmit measurement data, and/or to receive instructions from a base station.

Wake-up circuitry 108 may be configured to wake-up the sensor unit from a sleep mode, when a wake-up signal is received through antenna 102. When the sensor unit is awake, it may consume energy from the power supply 114. Otherwise, when the sensor unit is in a sleep mode, it may consume virtually no power (e.g., less than 50 nW, less than 10 nW or less than 1 nW) from the power supply in some embodiments. Operations of the wake-up circuitry are described in detail further below.

Wake-up circuitry 108 may be powered through input power terminal 120 (which may implemented using any suitable type of port or connector). The energy for powering the wake-up circuitry 108 may be provided in any suitable way. The manner in which the circuitry is powered may depend on the environment in which the wireless sensing apparatus is deployed. As such, input power terminal 120 may be coupled to switch 112, which may be configured to select one or more power sources for the wake-up circuitry. In the embodiment illustrated in FIG. 1A, switch 112 is coupled to energy harvester 110 and to power supply 114.

Energy harvester 110 may be configured to harvest energy, such as electromagnetic energy received through antenna 102. In some embodiments, energy harvester 110 extracts electromagnetic energy from the wake-up signal received through the antenna 102. In other embodiments, energy harvester 110 extracts electromagnetic energy from signals received through antenna 102 other than the wake-up signal. Energy harvester 110 may be implemented using a Dickson multiplier in some embodiments, or in general using diode-capacitor based charge storage techniques, though other implementations are also possible. The extracted energy may be used to charge an energy storing device (e.g., a capacitor or a bank of capacitors). In some embodiments, the energy stored in the energy storing device may be used to power at least a portion of wake-up circuitry 108, though in other embodiments, the energy is utilized as it is harvested without necessarily being stored. In at least some of the embodiments in which an energy storing device is used, the energy harvester may be coupled to the energy storing device via a switch. The switch may be configured to isolate the energy harvester from the energy storing device when the energy stored in the energy storing device has reached a certain level (e.g., 90%, 95% or 99% of its capacity). In this way, unnecessary drainage of the stored energy may be prevented in situations in which the signal received from the antenna decays for a prolonged period of time.

Power supply 114 may be implemented in any suitable, e.g., using one or more batteries. In some embodiments, sensor unit 106 is powered by power supply 114. Switch 112 may be controlled to select a power source for powering wake-up circuitry 108 between energy harvester 110 and power supply 114.

Figure 1B:
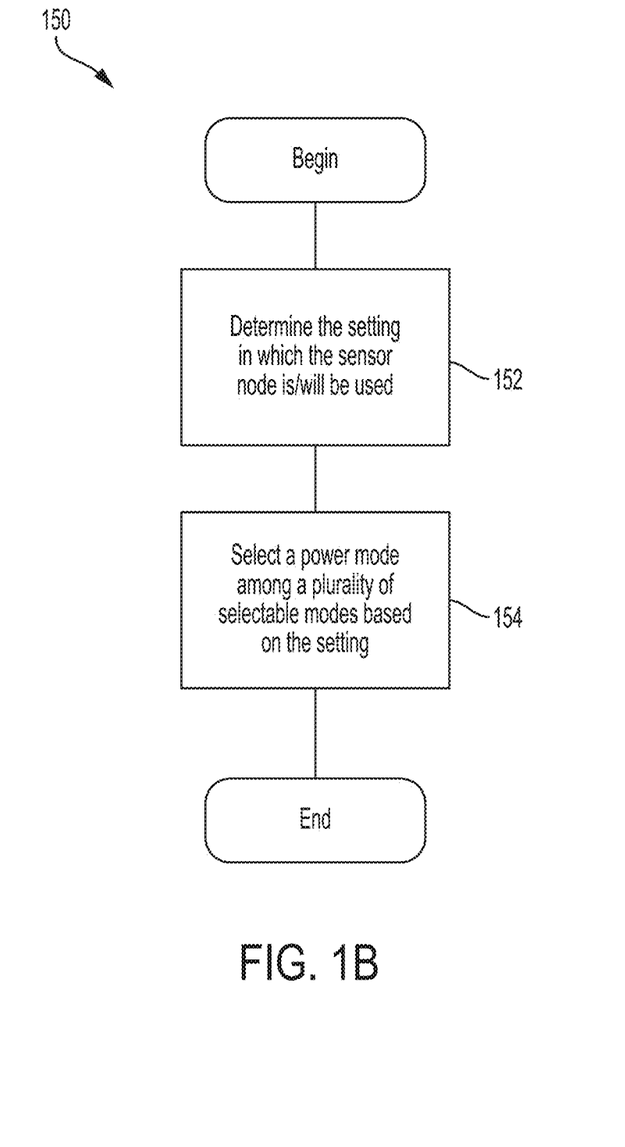
FIG. 1B is a flowchart illustrating a representative method for selecting a power mode, according to some non-limiting embodiments.

As described above, wake-up circuitry of the types described herein may be powered using different sources, depending for example on the setting in which the wireless sensing apparatus is utilized. FIG. 1B is a flowchart illustrating a representative method for selecting a power mode, according to some non-limiting embodiments. Method 150 begins at act 152, in which a user determines the type of setting in which the wireless sensing apparatus is intended to be used. In one example, the user may determine that the device transmitting the wake-up signal (referred herein as the transmitter) is located within a close range (e.g., between 1 cm and 5 m, between 1 cm and 4 m, between 1 cm and 3 m, between 1 cm and 2 m, between 1 cm and 1 m, or between 1 cm and 50 cm) relative to the wireless sensing apparatus. In such circumstances, the distance between the transmitter and the wireless sensing apparatus may be sufficiently short such that the power received at the wireless sensing apparatus is sufficient to power the wake-up circuitry.

In another example, the user may determine that the transmitter is located far (e.g., farther than 5 m, farther than 4 m, farther than 3 m, farther than 2 m, farther than 1 m, or farther than 50 cm) from the wireless sensing apparatus. In such circumstances, part of the power carried by the wake-up signal may be lost in the propagation, for example because the electromagnetic wave encoded with the wake-up signal is divergent. As a result, the power received at the wireless sensing apparatus may not be sufficient to power the wake-up circuitry.

Based on the setting in which the wireless sensing apparatus is intended to be used, a power mode may be selected at act 154. For example, if it is anticipated that the energy received at the wireless sensing apparatus through the wake-up signal may be sufficient to power the wake-up circuitry, a passive mode may be selected whereby the energy harvester serves as the power source. This may be the case when the transmitter is located within a close range relative to the wireless sensing apparatus. By contrast, if it is anticipated that the energy received at the wireless sensing apparatus through the wake-up signal may not be sufficient to power the wake-up circuitry, a power supply-assisted mode is selected whereby at least a portion of the power is provided by the power supply. It should be appreciated that the power supply-assisted mode may involve hybrid solutions, in which part of the power is provided by the energy harvester and the remaining power is provided by the power supply. Selection of the power mode, and hence the type of power to be used for powering the wake-up circuitry, may be accomplished using switch 112. Accordingly, in the passive mode, switch 112 may couple energy harvester 110 to input power terminal 120. In the power supply-assisted mode, switch 112 may couple power supply 114 to the input power terminal 120. Applicant has appreciated that by allowing a wireless sensing apparatus to operate in different powering modes, the same hardware may be used in settings having different requirements. In this way, the design of the wireless sensing apparatus need not to be necessarily tailored to a specific setting, thus significantly reducing design and manufacturing costs.

In one illustrative example, the same type of wireless sensing apparatus may be used in a pacemaker and in a network of sensor nodes. When used in a pacemaker, an operator may be able to position the transmitter proximate to the wireless sensing apparatus (for example by placing the transmitter in contact with the patient's chest) such that the energy for waking up the sensor unit is supplied directly from the transmitter. When used in a network, however, it may be impractical for an operator to position a transmitter near each single node of the network. In these circumstances, the wireless sensing node may be set to the power supply-assisted mode, in which at least a portion of the power necessary for the wake-up operations is provided by the power supply.

Figure 1C:
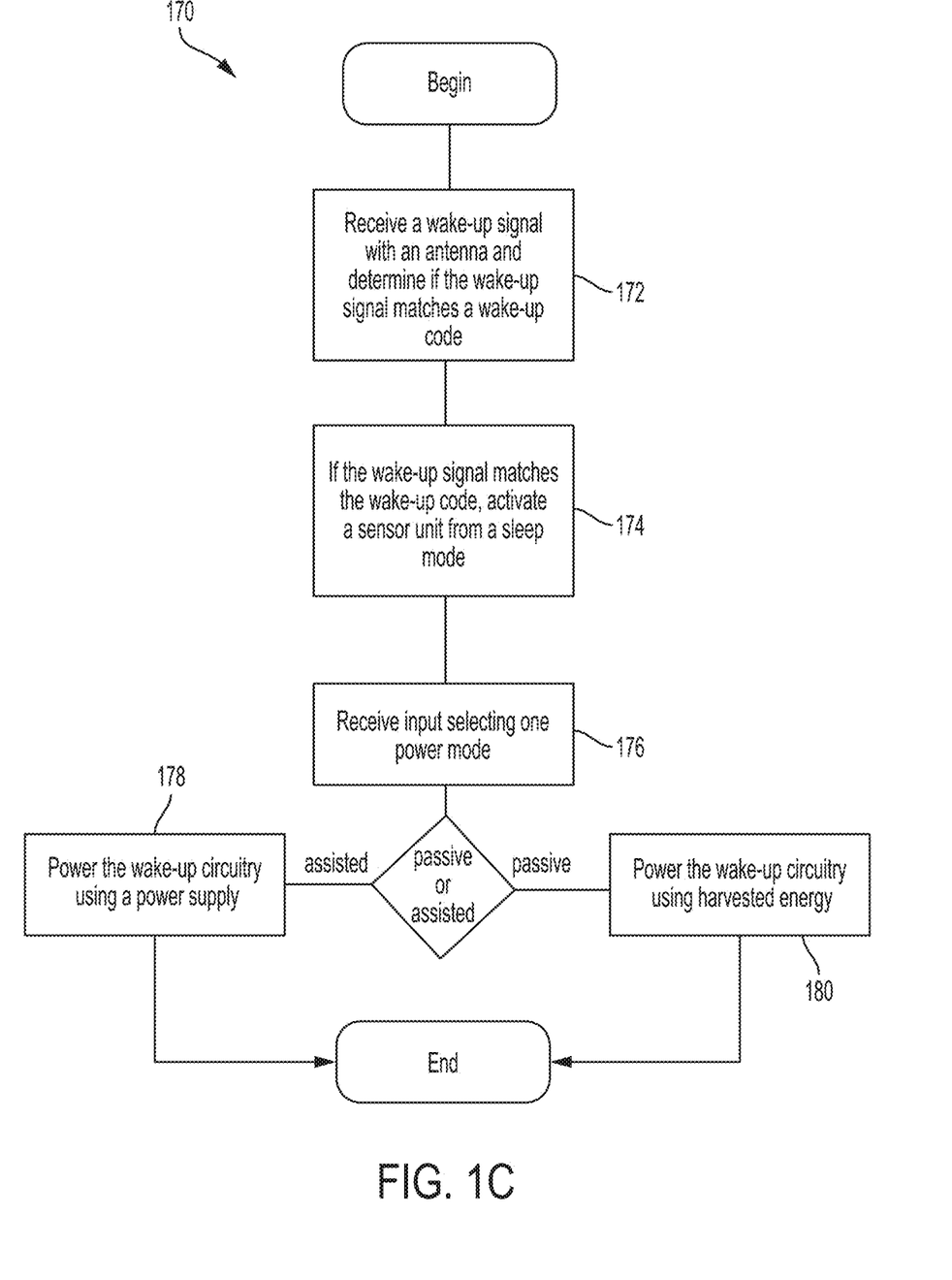
FIG. 1C is a flowchart illustrating a representative method for operating the wireless sensing apparatus of FIG. 1A, according to some non-limiting embodiments.

FIG. 1C is a flowchart illustrating a representative method for operating a wireless sensing apparatus, according to some non-limiting embodiments. Method 170 may begin at act 172, in which a wake-up signal is received at the wireless sensing apparatus using an antenna (e.g., antenna 102). To avoid false alarms (i.e., to prevent waking up the sensor unit unless intentionally requested to do so), in some embodiments, the content of the wake-up signal is compared to a predefined code (referred to herein as the wake-up code). The wake-up code may be stored in a local memory.

If the content of the wake-up signal matches or at least substantially matches (e.g., at least 90% of the bits match) the wake-up code, at act 174 the sensor node may be activated from the sleep mode. When activated, the sensor unit may draw power from the power supply and sensing operations and/or transmission of sensed data to a base station may begin.

At act 176, input indicative of a power mode selection may be received. The input may be generated, in one example, using method 150 as described above. In some embodiments, the received input may actuate a switch for selecting the appropriate power source for the input power terminal of the wake-up circuitry.

In one example, the selection may lead to one of two possible modes: the power supply-assisted mode and the passive mode. If the power supply-assisted mode is selected, method 170 moves to act 178, in which the wake-up circuitry is powered at least partially using the power supply. This mode may be selected by a user when it is anticipated that the harvested power may not be sufficient (e.g., when the distance between the transmitter and the wireless sensing apparatus is above a certain threshold). Yet, some power may still be supplied via energy harvesting, thus at least partially limiting depletion of the power supply. By contrast, if the passive mode is selected, method 170 proceeds to act 180, in which the wake-up circuitry may be powered using the harvested energy. In some embodiments, the wake-up circuitry may be powered entirely with the harvested energy in the passive mode. In other embodiments, however, part of the energy for powering the wake-up circuitry may be provided by the power supply in the passive mode. In these embodiments, the ratio between the energy supplied by the power supply to the energy supplied by the energy harvester in the power supply-assisted mode is greater than the same ratio in the passive mode. In other words, while both power modes may include hybrid power mixes in some embodiments, the fraction of energy supplied by the energy harvester is greater in the passive mode. For example, 80% of the energy may be supplied by the energy harvester and the remaining 20% by the power supply in the passive mode; in the power supply-assisted mode, 40% of the energy may be supplied by the energy harvester and the remaining 60% by the power supply.

In some embodiments, the power mode may be switched dynamically depending on the wake-up circuitry's demands. That is, if the passive mode is selected, and yet, the harvested energy turns out to be insufficient at some point in time, wireless sensing apparatus may revert to the power supply-assisted mode. It should be appreciated that acts 176 and 178 or 180 may occur at any time relative to acts 172 and 174. That is, acts 176 and 178 or 180 may occur concurrently, before or after acts 172 and 174.

It should be further appreciated that, in some circumstances, it may be desirable to alternate between the passive mode and the power supply-assisted mode. In one example, a wireless sensing apparatus may be programmed to cycle between the two modes (e.g., 80% of the time in the passive mode and 20% of the time in the power supply-assisted mode). Additionally, or alternatively, a wireless sensing apparatus may by default operate in the passive mode. However, when a certain condition is met, the apparatus may be set to the power supply-assisted mode. One such condition may be met when the signal level of the energy harvester in the passive mode has reached a specific value. Another condition may be met when a unique code has been identified in a signal received through the antenna. Other events may set the apparatus to the supply power-assisted mode, including for example specific meteorological events.

Figure 2A:
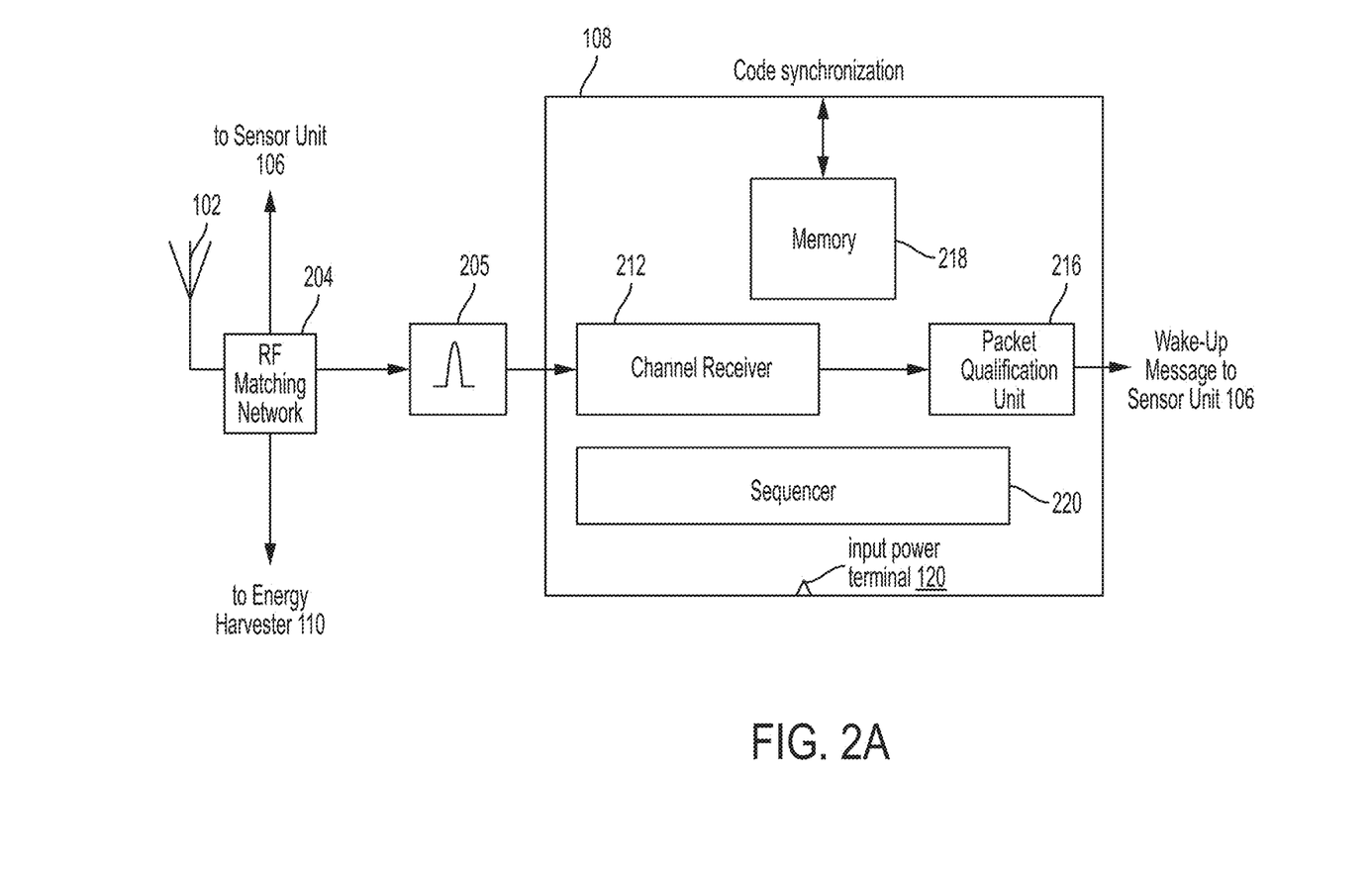
FIG. 2A is a block diagram illustrating a possible implementation for the wake-up circuitry, according to some non-limiting embodiments.

FIG. 2A is a block diagram illustrating a possible implementation for the wake-up circuitry of FIG. 1, according to some non-limiting embodiments. Wake-up circuitry 108 may comprise a channel receiver 212, a packet qualification unit 216, a memory 218, a sequencer 220, and, as described above, an input power terminal 120. Furthermore, wake-up circuitry 108 may be coupled to antenna 102 via radio-frequency (RF) matching network 204 (which may serve as combiner 104) and a bandpass filter 205

Channel receiver 212 may comprise a demodulator, and an analog-to-digital converter (ADC) in some embodiments. The demodulator may be configured to demodulate the received signal according to any suitable modulation scheme, such as on-off keying (OOK), amplitude shift keying (ASK), frequency shift keying (FSK), phase shift keying (PSK), Gaussian frequency shift keying (GFSK), and any suitable multi-level scheme thereof.

The demodulated signal may be provided to the packet qualification unit 216. The packet qualification unit 216 may compare a packet extracted from the received signal with a code stored in the memory (the wake-up code). If the packet matches or substantially matches the stored code, the packet qualification unit 216 may determine that the received packet is intended to provide a wake-up message. In this case, the wake-up circuitry may provide a wake-up message for activating the sensor unit 106 from the sleep mode. If the received packet does not match the code, however, the packet qualification unit 216 may determine that no wake-up message was received.

The memory 218 may comprise a programmable read-only memory (PROM) in some embodiments. A wake-up code may be transferred to the memory using a wireless or wired interface. The code may be synchronized with an external base station periodically or one time only.

Sequencer 220 may comprise circuitry for providing a time-base signal (e.g., a clock signal) to the wake-up circuitry. For example, the sequencer may comprise an RC oscillator. The time-base signal provided by the sequencer may have a rate that is a multiple of the data rate of the received signal (e.g., 10 times faster, 50 times faster, 100 times faster or 1000 times faster). For example, if the received signal is configured to carry data at 100 Kb/s, the time-base signal may be configured to oscillate at 10 MHz. In this way, the channel receiver may have a large enough temporal resolution to be able to extract packets from a received signal with such a data rate.

Figure 2B:
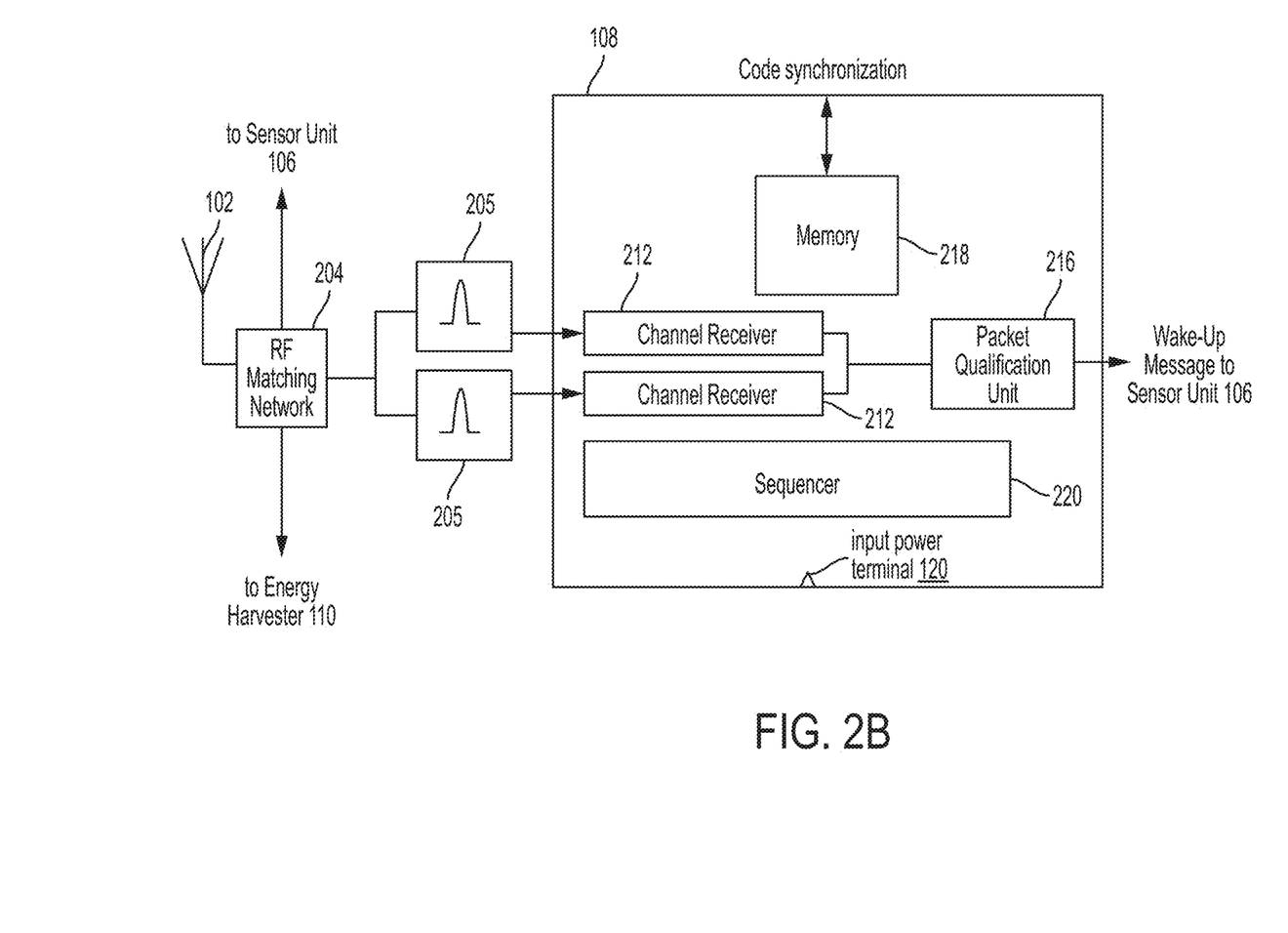
FIG. 2B is a block diagram illustrating a possible multi-channel implementation for the wake-up circuitry, according to some non-limiting embodiments.

In some embodiments, a wake-up circuitry of the type described herein may be connected to more than one wireless sensor nodes. In some embodiments, the wake-up circuitry may comprise multiple frequency channel circuits (e.g., multiple bandpass filters and multiple channel receivers), each frequency channel circuit being configured to receive signals at a different carrier frequency. Accordingly, wake-up packets directed to different nodes may be encoded with different carrier frequencies. One representative wake-up circuitry arranged to operate in a multi-channel configuration is illustrated in FIG. 2B, according to some non-limiting embodiments. As illustrated, multiple bandpass filters (two in this case, although any other suitable number of channels may be used) are used to select specific frequency bands. For example, one channel may be in the 13.553 MHz-13.567 MHz band, one channel may be in the 902 MHz-928 MHz band and one channel may be in the 2.4 GHz-2.5 GHz band. Additionally, or alternatively, multiple channels may be used in a single ISM band.

Figure 3:
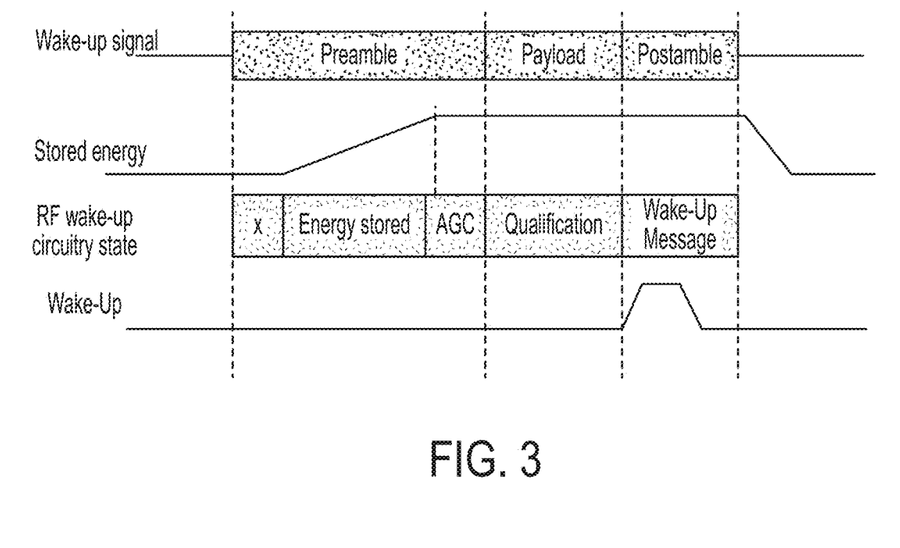
FIG. 3 is a diagram illustrating schematically the operations of the wake-up circuitry of FIG. 2A, according to some non-limiting embodiments.

As described in connection with FIG. 2A, a wake-up signal may have at least two functions in some embodiments: i) it may power at least a portion of the wake-up circuitry, and ii) it may carry a packet that is intended to wake up the sensor unit. Accordingly, wake-up signals may be encoded according to specific protocols that meet these two requirements. The protocol may be known by the transmitter and the receiver. One non-limiting example of such a protocol is illustrated in FIG. 3. As illustrated, a wake-up signal may comprise a preamble, a payload and a postamble.

During the preamble phase, the energy harvester may be configured to harvest electromagnetic energy from the wake-up signal and to store such energy in the energy storing device. During this phase, the energy of the wake-up signal may be extracted using the energy harvester. As a result, the energy stored in the energy storing device of the energy harvester is increased. The duration of the preamble may be configured to charge the energy storing device by a desired amount (e.g., 75% of its charge capacity, 90% of its charge capacity, 99% of its charge capacity, or any value within such values), before the payload is received. In some embodiments, automatic gain control (AGC) may be performed during the time interval in which the energy storing device is charged by the desired amount and before the payload is received.

The wake-up signal's payload may comprise a packet commanding wake-up of the sensor unit. During the payload phase, the energy storing device may power, at least partially, the wake-up circuitry while the packet qualification unit 216 compares the received packet to the code stored in the memory. During this phase, the wake-up circuitry determines whether the sensor unit is to be awakened or not. In some embodiments, the energy harvester may be isolated from the energy storing device (using a switch) throughout the duration of the payload (or at least a portion thereof) to prevent unnecessary drainage of the stored energy.

During the postamble phase, a wake-up massage may be sent to the sensor unit if the packet matches the code. In this phase, the harvester may continue to harvest energy from the wake-up signal as needed.

In some circumstances, the energy storing device may be at least partially pre-charged when a wake-up signal is received. This circumstance will be referred to herein as a "warm start". In contrast, in other circumstances, the energy storing device may not be charged at all when a wake-up signal is received. This circumstance will be referred to herein as a "cold start". Warm starts may be more desirable than cold starts, as the time it takes the wake-up circuitry to reach a desired power level is shorter. In addition, the sensitivity of the channel receiver may be greater when the energy storage device is at least partially pre-charged. In some embodiments, an wake-up circuitry may promote warm starts by harvesting background radiation. In one example, background radiation having frequencies within the bandwidth of the bandpass filter may be harvested.

Powering of the wake-up circuitry may require that a minimum amount of power is harvested. The amount of power harvested may depend on the power of the wake-up signal and the duration of the preamble. In some embodiments, the power of the wake-up signal and the duration of the preamble may be selected to provide at least 200 nW.

In some embodiments, the sensitivity of the energy harvester may be limited. For example, the sensitivity of an energy harvester comprising a Dickson multiplier may be limited to approximately −30 dBm in some embodiments. For this reason, it may be desirable to provide a wake-up signal with enough power to meet the harvester sensitivity. In some embodiments, it may desirable to provide a wake-up signal with additional headroom power to offset losses that may occur before the signal is received.

The RF matching network 204 may be configured to optimize power transfer to the wireless sensing apparatus. The RF matching network may, for example, limit back reflections thus enhancing power transfer. The RF matching network may comprise any suitable combination of resistive, capacitive and inductive elements, and/or amplifiers.

Figure 4:
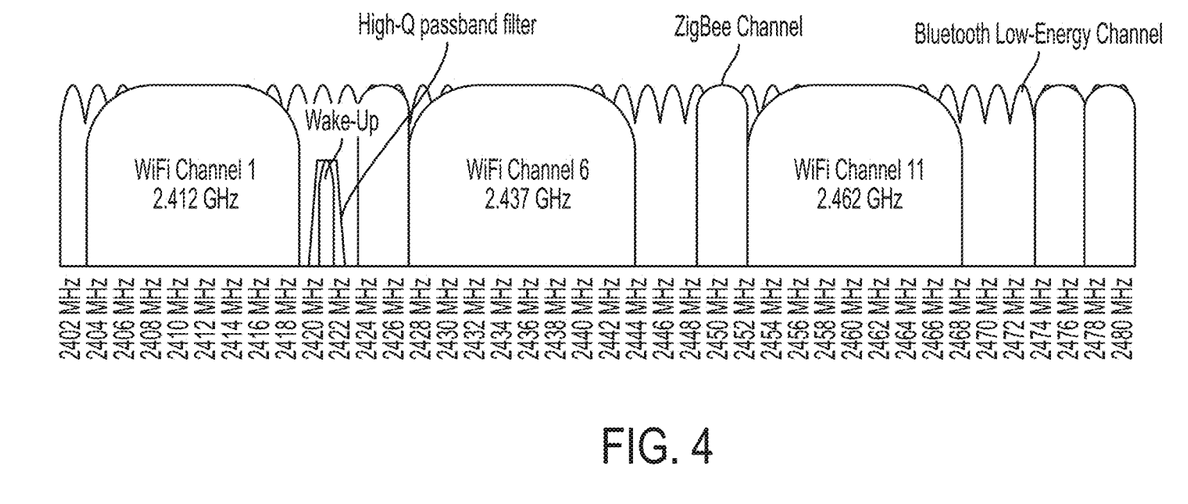
FIG. 4 is a diagram illustrating a portion of the electromagnetic spectrum in the Industrial, Scientific, and Medical (ISM) radio band, according to some non-limiting embodiments.

The received signal may be filtered using the bandpass filter 205 (or bandpass filter bank 205). Bandpass filter 205 may be disposed on a separate chip with respect to wake-up circuitry 108, or on the same chip. The use of a bandpass filter may limit interference with adjacent frequency channels and may thus limit background noise. In some circumstances, the power of the wake-up signal may be very low, for instance because the transmitter is located far away from the wireless sensing apparatus. In these circumstances, the signal-to-noise ratio (SNR) associated with the wake-up signal may be low, thus increasing the probability that the packet contained in the wake-up signal includes errors when read by the wake-up circuitry. FIG. 4 is a diagram illustrating different sub-bands in the 2.4 GHz-2.5 GHz range. In this specific example, the wake-up signal (labeled "wake-up") has a carrier frequency of 2.421 GHz. As illustrated, this portion of the electromagnetic spectrum can be particularly crowded, due to the presence of other communication channels, such as WiFi channels, ZigBee channels, Bluetooth Low-Energy channels, and possibly others. The energy of these channels may be captured by antenna 104, thus decreasing the SNR of the wake-up signal inside the wireless sensing apparatus.

Figure 5:
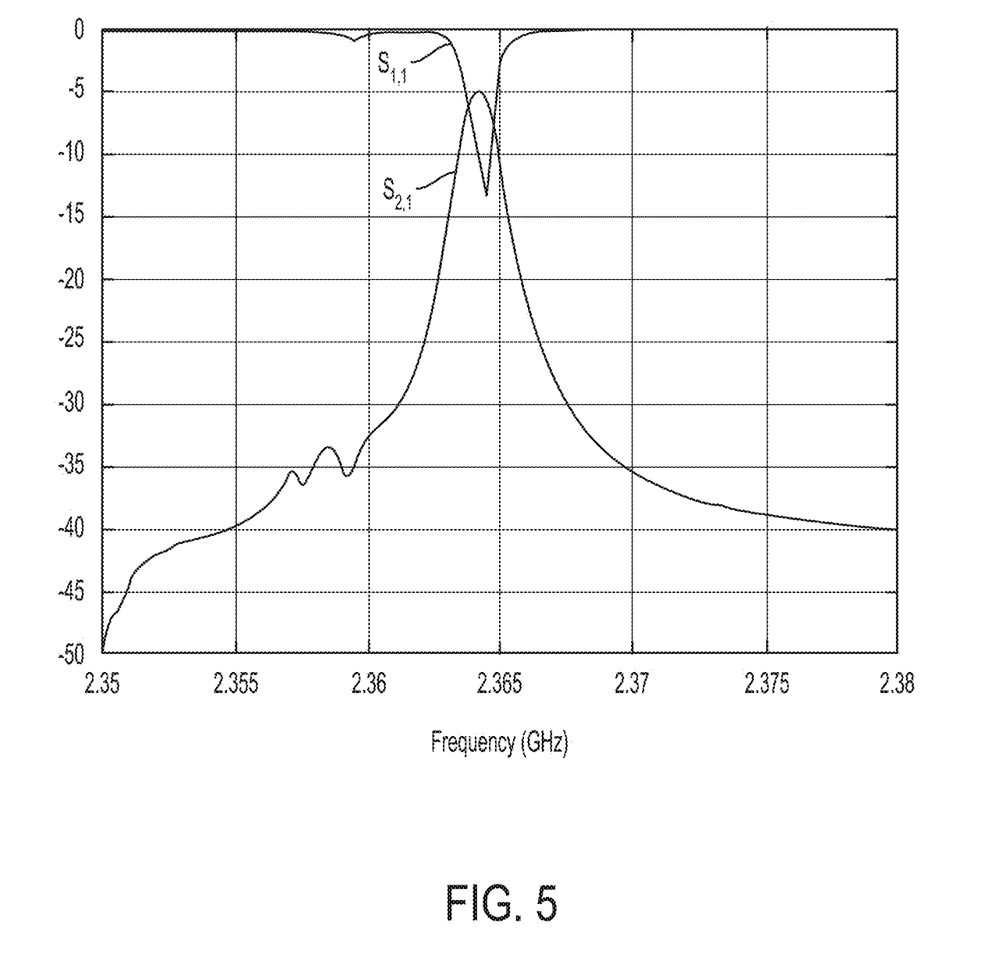
FIG. 5 is a plot illustrating the spectral response of a representative passband filter that may be used in connection with the wake-up circuitry of FIG. 2A, according to some non-limiting embodiments.

Applicant has appreciate that the wake-up circuitry's resilience to interference and broadband noise, and the SNR of the wake-up signal may be increased by significantly reducing the bandwidth of filter 205. In some embodiments, for example, the bandwidth may be reduced such that only the spectrum of the wake-up signal and a limited amount of interference or noise can pass through without attenuation. In one non-limiting example, the 3 dB-bandwidth of the filter is set to be substantially equal to (e.g., ±20%) the 3 dB-bandwidth of the wake-up signal (as shown in FIG. 4, which illustrates a filter response labeled "high-Q passband filter"). In some embodiments, filter 205 may have a quality factor (Q) that is between 500 and 50000, between 500 and 10000, between 500 and 5000, between 500 and 3000, between 1000 and 50000, between 1000 and 10000, between 1000 and 5000, between 1000 and 4000, between 1000 and 3000, between 1000 and 2000, between 2000 and 10000, between 2000 and 5000, between 2000 and 4000, between 2000 and 3000, or between any other suitable values. For example, in the embodiments in which transmission of the wake-up signal is performed in the 2.4 GHz-2.5 GHz band, the filter's bandwidth may be between 200 KHz and 2.5 MHz. FIG. 5 is a plot illustrating a possible filter response for passband filter 205, according to some non-limiting embodiments. Specifically, the $S_{11}$ coefficient (representing the power reflected at the filter's input port) and the $S_{21}$ coefficient (representing the power transferred from the filter's input port to the filter's output) are shown. In this case, the 3 dB-bandwidth of the filter is about 1 MHz and the filter's central frequency is 2.365 GHz, thus leading to a Q as high as 2365.

Passband filter 205 may be implemented in any of suitable way. In one embodiment, the passband is implemented using micromachined (MEMS) filters, such as a MEMS resonators. In another embodiment, a quartz-based filter can be used. In yet another embodiment, a surface acoustic wave (SAW) filter is used for passband filter 205.

Figure 6A:
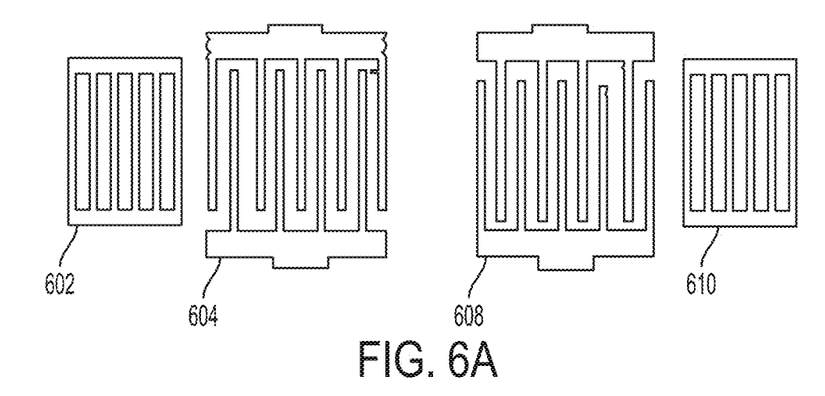
FIGS. 6A-6B are a top view and a side view, respectively, illustrating a surface acoustic wave (SAW) filter that may be used in connection with the wake-up circuitry of FIG. 2A, according to some non-limiting embodiments.
Figure 6B:
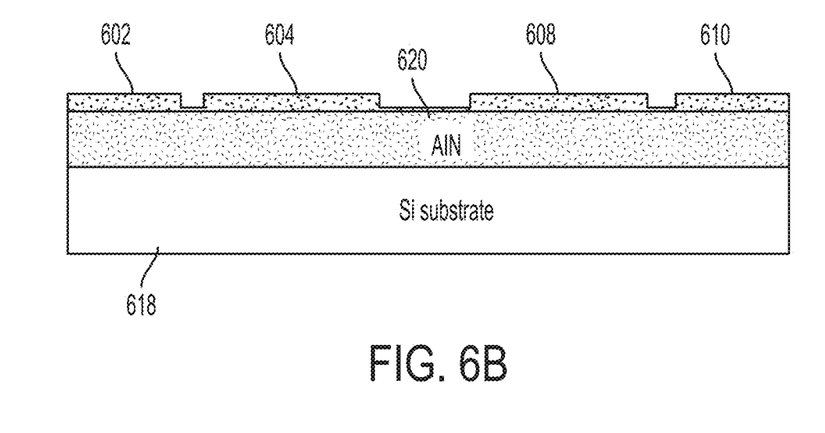

An example of a SAW filter that may be used for passband filter 205 is depicted in FIGS. 6A-6B, according to some non-limiting embodiments. Specifically, FIG. 6A is a top view illustrating the SAW filter's electrodes and FIG. 6B is a cross sectional view. Numerals 602 and 610 indicate the filter's input and output reflectors, respectively. Numerals 604 and 608 indicate the filter's input transducer (electrical-to-acoustic) and output transducer (acoustic-to-electrical), respectively. As shown in FIG. 6B, the reflectors and the transducers may be formed on a layer 620 of aluminum nitride (AlN), which may support propagation of the acoustic waves. It should be appreciated that not all embodiments are limited to layers made of AlN, as other piezoelectric materials may alternatively or additionally be used. Layer 620 may be formed, at least in some embodiments, on a silicon substrate 618. It should be further appreciated that the configuration of FIGS. 6A-6B is illustrative only, as other alternative arrangements for the passband filter 205 are also possible.

A wireless sensing apparatus of the types described herein may be employed in a variety of settings, including in sports, healthcare, scientific, military, and industrial applications, among others.

A wake-up circuitry of the type described herein may be used in connection with a portable device, such as a smartphone or a smartwatch. The portable device may have an application installed thereon, which may be configured to provide wake-up signals. Upon receiving one such wake-up signal, a wake-up circuitry may wake up one or more corresponding sensor units.

Figure 7:
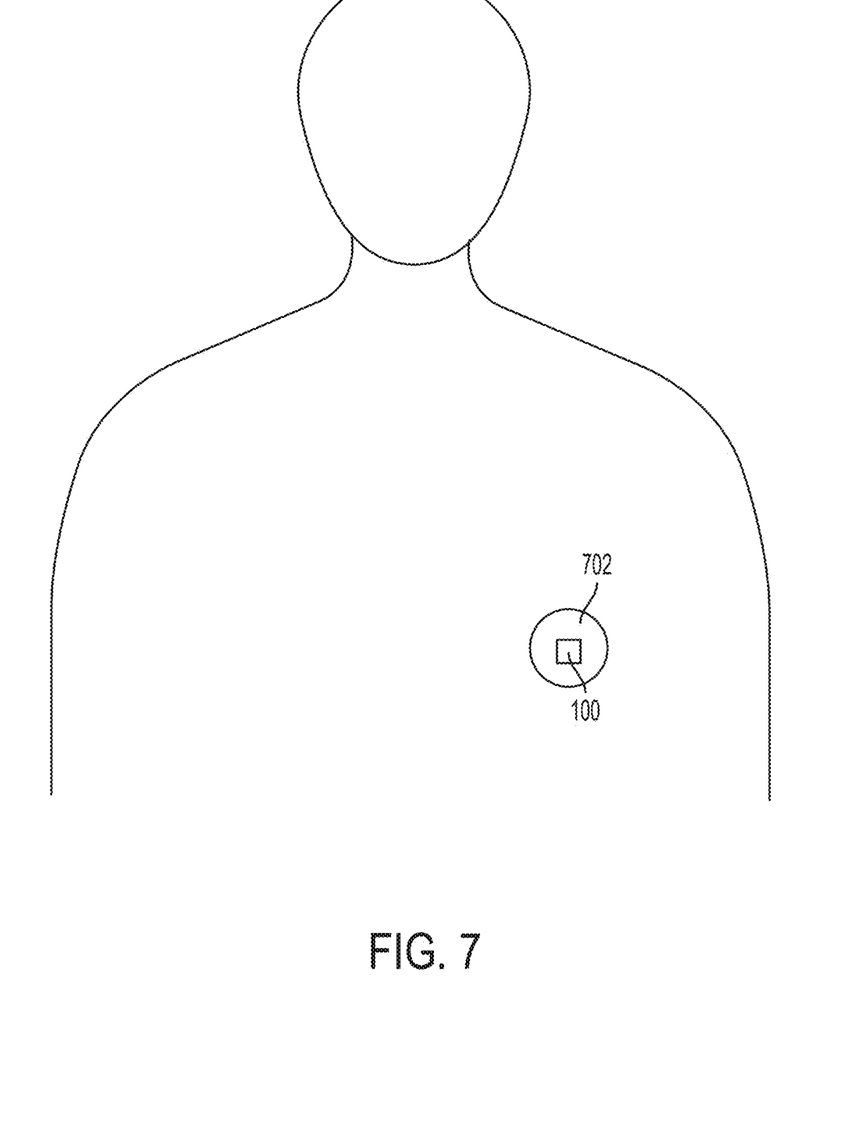
FIG. 7 is a schematic diagram illustrating a pacemaker comprising a wireless sensing apparatus of the types described herein, according to some non-limiting embodiments.

In one specific example, wireless sensing apparatus 100 may be used in a pacemaker, as illustrated in FIG. 7. In this example, wireless sensing apparatus 100 is mounted on pacemaker 702. The sensor unit of the wireless sensing apparatus may be configured to monitor the activity of the pacemaker and/or of the patient's heart itself. For example, the sensor unit may include a pressure sensor. In some embodiments, the sensor unit may be placed in a sleep mode until a wake-up signal is received. In some embodiments, powering of the wake-up circuitry may be performed through energy harvesting. Applicant has appreciated that mounting a wake-up circuitry of the type described herein on a pacemaker may extend the pacemaker's lifetime. Conventional pacemaker often do not include on/off switches. As a result, even when the pacemaker is not being used and is, for example, sitting on a shelf, it may draw current and hence deplete the batteries. Using a wake-up circuitry of the types described herein, however, may allow users to effectively turn off the pacemaker by putting in a sleep mode. Subsequently, when ready to be inserted, the pacemaker may be activated using a wake-up signal.

In another example, a wireless sensing apparatus of the type described herein may be used to localize a lost portable device, such as a smartphone, a smartwatch or a remote control. Localization may be performed even if the portable device has run out of battery.

Aspects of the present application may provide one or more benefits, some of which have been previously described. Now described are some non-limiting examples of such benefits. It should be appreciated that not all aspects and embodiments necessarily provide all of the benefits now described. Further, it should be appreciated that aspects of the present application may provide additional benefits to those now described.

Some aspects of the present application provide a universal wireless sensing apparatus that may be employed in a variety of settings without having to redesign or replace the hardware. For example, the same piece of apparatus may be used in settings in which powering via energy harvesting is sufficient or in settings in which energy harvesting is not sufficient.

Other aspects of the present application provide a wake-up wireless sensor having an increased immunity to RF interference and broadband noise. In some embodiments, increasing the immunity to interference and noise may significantly improve the apparatus' ability to determine whether a wake-up signal has been received. In addition, the probability of false alarms may be reduced, thus limiting unnecessary battery usage. Furthermore, the increased immunity to interference and noise may ensure that the sensor is promptly activated when a request has been sent. Immunity to interference and noise may be increased in some embodiments by increasing the quality factor of the bandpass filter.

What is claimed is:

1. A wireless sensing apparatus comprising:
   a sensor unit;
   wake-up circuitry connected to an antenna and configured to activate the sensor unit from a sleep mode upon receiving a wake-up signal from the antenna, the wake-up circuitry having an input power terminal;
   an energy harvester connected to the antenna and configured to capture electromagnetic energy received from the antenna; and
   a switch connected to the input power terminal of the wake-up circuitry, the energy harvester and a power supply, the switch being configured to be controlled by a user to select a source of power for the wake-up circuitry between the power supply and the energy harvester.

2. The wireless sensing apparatus of claim 1, wherein the energy harvester is configured to capture the electromagnetic energy by extracting power from the wake-up signal received from the antenna.

3. The wireless sensing apparatus of claim 1, wherein the antenna is connected to the sensor unit and is configured to transfer data indicative of information sensed by the sensor unit outside the wireless sensing apparatus.

4. The wireless sensing apparatus of claim 1, further comprising a bandpass filter disposed between the antenna and the wake-up circuitry, the bandpass filter having a quality factor (Q) that is between 1000 and 10000.

5. The wireless sensing apparatus of claim 1, further comprising a memory unit configured to store therein a wake-up code, wherein the wake-up circuitry is configured to compare a packet of the wake-up signal to the wake-up code and to activate the sensor unit from the sleep mode if it determines that the packet substantially matches the wake-up code.

6. The wireless sensing apparatus of claim 1, wherein the energy harvester comprises a Dickson multiplier or a diode-capacitor circuit.

7. A method for operating a wireless sensing apparatus, the method comprising:
receiving a wake-up signal through an antenna and determining whether a packet of the received wake-up signal substantially matches a wake-up code stored in a memory unit;
with wake-up circuitry, activating a sensor unit of the wireless sensing apparatus from a sleep mode based on whether the packet substantially matches the wake-up code; and
receiving input from a user selecting one power mode between a passive mode and a power supply-assisted mode;
wherein:
in the power supply-assisted mode, the wake-up circuitry is configured to be powered at least partially by a power supply; and
in the passive mode, the wake-up circuitry is configured to be powered using electromagnetic energy received with the antenna.

8. The method of claim 7, wherein receiving input from the user comprises determining a state of a switch connected to the wake-up circuitry.

9. The method of claim 7, further comprising transmitting data indicative of information sensed by the sensor unit through the antenna.

10. The method of claim 7, wherein:
in the passive mode, the wake-up circuitry is configured to be powered using electromagnetic energy extracted from the wake-up signal with an energy harvester connected to the antenna.

11. The method of claim 7, further comprising filtering the received wake-up signal with a bandpass filter disposed between the antenna and the wake-up circuitry, the bandpass filter having a quality factor (Q) that is between 1000 and 10000.

12. The method of claim 7, further comprising extracting electromagnetic energy from the wake-up signal and storing the extracted electromagnetic energy in an energy storing device, wherein:
in the passive mode, the wake-up circuitry is configured to be powered using the stored electromagnetic energy.

13. A wireless sensing apparatus comprising:
a sensor unit;
wake-up circuitry connected to an antenna and configured to activate the sensor unit from a sleep mode upon receiving a wake-up signal from the antenna;
an energy harvester connected to the antenna, the energy harvester being configured to capture electromagnetic energy received from the antenna and to power at least partially the wake-up circuitry with the captured electromagnetic energy; and
a bandpass filter disposed between the antenna and the wake-up circuitry and configured to filter the wake-up signal, the bandpass filter having a quality factor (Q) that is between 1000 and 10000.

14. The wireless sensing apparatus of claim 13, wherein the bandpass filter and the wake-up circuitry are disposed on separate integrated circuits.

15. The wireless sensing apparatus of claim 13, wherein the bandpass filter comprises a surface acoustic wave (SAW) filter.

16. The wireless sensing apparatus of claim 15, wherein the SAW filter comprises a layer of aluminum nitride disposed on a substrate.

17. The wireless sensing apparatus of claim 13, wherein the bandpass filter comprises a quartz crystal filter.

18. The wireless sensing apparatus of claim 13, wherein the energy harvester comprises a Dickson multiplier or a diode-capacitor circuit.

19. The wireless sensing apparatus of claim 13, wherein the antenna is connected to the sensor unit and is configured to transfer data indicative of information sensed by the sensor unit outside the wireless sensing apparatus.

20. The wireless sensing apparatus of claim 13, further comprising a memory unit configured to store therein a wake-up code, wherein the wake-up circuitry is configured to compare a packet of the wake-up signal to the wake-up code and to activate the sensor unit from the sleep mode if it determines that the packet substantially matches the wake-up code.

* * * * *